United States Patent Office 3,062,874
Patented Nov. 6, 1962

3,062,874
SYNTHESIS OF MIXED TERPENE ESTERS FROM MYRCENE HYDROHALIDES
Paul G. Bay, Skokie, Ill., assignor to The Glidden Company, Cleveland, Ohio, a corporation of Ohio
No Drawing. Filed Sept. 15, 1958, Ser. No. 760,833
12 Claims. (Cl. 260—489)

This invention relates to the synthesis of mixed terpene esters of $C_{10}$ terpene alcohols and more specifically, to a novel process for the preparation of high yields of said esters from myrcene hydrochloride and dihydrochloride.

Geranyl and linalyl acetates are known esters of geraniol and linalool and are available commercially for various uses including use in perfumery compositions and related applications. Other known esters of geraniol include, for example, the formates and butyrates which can likewise be used in perfumery. Some of these esters can be synthesized, but usually such synthesis has not resulted in high yields of the esters. For example, geranyl acetate which occurs in many essential oils and is the main constituent of the volatile oil *Darwinia fasciculis* can be obtained from such volatile oil or produced from geraniol by treatment with acetic anhydride, and sodium acetate. Likewise, geranyl formate and geranyl butyrate are constituents of essential oils and can be employed either in perfumes or for reconstituting compositions of essential oils. Linalyl acetate, an ester of linalool, is a valuable constituent of lavender oil, and likewise is available commercially and is useful in perfumery. Since the synthesis of these esters from raw materials or their preparation from the essential oils is dependent to a large extent on the importation of such, thereby resulting in expensive esters of these compounds, it would be desirable to provide an economical process for their preparation in high yields and from readily available domestic raw materials.

It is an object of my invention to prepare esters of terpene alcohols and aliphatic acids by a simple and inexpensive method.

A further object of my invention is to prepare lower fatty acid esters from myrcene mono- and dihydrohalides by a simple and inexpensive process.

A more specific object of my invention is the preparation of lower fatty acid mono- and di-esters from myrcene mono- and dihydrohalide as well as 2-chloro-8-acyloxy-2,6-dimethyl-6-octene and derivatives of this latter compound.

I have found that I can convert myrcene mono- and dihydrohalide to high yields of esters of linalool and geraniol and diesters of the corresponding dihydroxy compounds by a process which comprises treating said myrcene hydrohalides with the ammonium salt of a lower saturated fatty acid in the presence or absence of the corresponding acid. Yields of from 75% and over of mixed acetates of geraniol, nerol, linalool have been obtained by the treatment in accordance with my invention. My invention will be more fully described below, after reference to the starting materials which do not form a part of this invention.

Myrcene, a precursor in the synthesis of the mixed esters of my invention, occurs in nature, but is economically and commercially available only by the pyrolysis of β-pinene. When produced from β-pinene, say by pyrolyzing in the vapor phase at a temperature of about 500° C., it usually contains more or less unreacted β-pinene, limonene and other minor impurities as coproducts. The pyrolysis product of substantially pure β-pinene analyzes approximately as follows: myrcene 60–80%, β-pinene 2–4%, limonene 8–10% and a small percentage of polymeric and other material.

It is known that myrcene can be treated with a hydrogen halide to produce myrcene monohydrohalide which can be reacted with sodium acetate to produce linalyl and/or geranyl acetate. By a hydrogen halide it is intended to include hydrogen chloride, hydrogen bromide and hydrogen iodide. Reference will be made to hydrogen chloride in this specification since the myrcene hydrochlorides are the least expensive of these compounds.

The method for preparing myrcene hydrochloride does not form a part of this invention, but it can be briefly stated that earlier investigators have prepared it by passing hydrogen chloride into myrcene in the presence or absence of solvent and at temperatures ranging from −20° to 100° C. (Booth et al., Serial No. 331,515, filed January 15, 1953, now U.S. Patent 2,871,271); or by passing hydrogen chloride at temperatures of from 0° to 50° C. according to the method of Knapp et al., U.S. Patent 2,609,388. Thus, myrcene hydrochloride will be understood to mean a mixture comprising predominantly linalyl and geranyl chloride and smaller quantities of bornyl chloride and terpinyl chloride. See also Webb, copending application Serial No. 768,875 filed September 15, 1958, for a method for preparing myrcene monohydrochloride wherein the geranyl chloride or linalyl chloride are the predominant chlorides. I can employ substantially pure linalyl chloride, geranyl chloride or mixtures thereof or a mixture obtained by hydrochlorinating myrcene in accordance with the methods of the prior art.

A method for preparing myrcene dihydrochloride is disclosed in my copending application Serial No. 760,854 filed September 15, 1958. Briefly, in that application I disclose the preparation of myrcene dihydrohalides generally, and specifically dihydrochlorides, by a process which comprises treating myrcene in the presence of a cuprous chloride catalyst with up to 2 equivalents of anhydrous hydrogen chloride. The examples presented in this specification illustrate the addition of hydrogen chloride to myrcene by this method although it should be realized that once the dihydrochloride product is prepared, by any method, that product can be employed by my instant process. The use of cuprous chloride in the preparation of the mono- and dihydrochlorides does constitute, however, a preferred method of obtaining said compounds.

In a broad aspect of my invention wherein I employ myrcene monohydrochloride, I prepare an ester mixture comprising the lower saturated fatty acid esters of, preferably, geraniol (nerol) and linalool, by treating said myrcene hydrochloride with the ammonium salt of a lower fatty acid in solid or molten form and in the presence or absence of the corresponding fatty acid. This aspect of my invention is also applicable to myrcene dihydrochloride. Thus, my invention can be broadly defined as a method of preparing esters of terpene alcohols and aliphatic acids by treatment of myrcene hydrochlorides with ammonium salts of lower fatty acids.

Exemplary of the organic acids which I can employ in the process of my invention are: formic, acetic, propionic, butyric, isobutyric, valeric, isovaleric acids and the like. Acids containing from 1 to 5 carbon atoms are presently preferred. All of these organic acids form ammonium salts and these salts can be reacted with the myrcene mono- and dihydrochlorides in accordance with the teachings of this invention. I can prepare the ammonium salts of these acids by passing ammonia into the particular acid to thereby obtain high yields of the ammonium salts. Although these reagents can be readily prepared or are available commercially, reference can be made to the literature for a discussion of their preparation and properties. (See S. Zuffantes J.A.C.S. 63,-3123-4, 1941). Anhydrous conditions are preferred in the process of this invention, although in instances where a solvent is used, a small quantity, i.e. up to about 5% of water can be tolerated.

The ammonium salts, in the preferred embodiment of my invention, can be employed in the solid or molten state and in the presence or absence of the corresponding organic acid. Excellent yields of the mixed esters are obtained by this process and the esters posses excellent organoleptic and physical qualities. Further, solvents such as acetone, xylene, toluene, carbon tetrachloride and the like, can be used in place of the aliphatic acid although little advantage is realized by this substitution.

I prefer to employ amounts of ammonium salts varying from 1 to 2 moles per mole of starting myrcene hydrochloride. Higher amounts can be used. If the corresponding organic acid is used in conjunction with the ammonium salt, it can be used in amounts of from 1 to 75% of the total weight of ammonium salts and corresponding acids. It should be understood that the essence of my invention is a process whereby the ammonium salts are displacement reagents and can be used without a solvent, in the molten state as will be illustrated below. The unique adaptability of these salts to this process is further enhanced by the fact that their melting points, 91° to 118° C., are well below the limits where dehydrohalogenation becomes critical.

Where the process of my invention is to be conducted at elevated temperatures, I have found that heat can be applied up to about 140° C. It is not necessary nor desirable to employ such high temperatures, however, since the reaction of myrcene hydrochloride and the ammonium salt will proceed at temperatures as low as 0° C. In general, however, short reaction periods at low temperatures yield mainly the linalyl isomer when the monohydrochloride is the reagent whereas high temperatures and longer reaction periods favor the formation of the geranyl isomer. Accordingly, the formation of the desired isomer can be controlled to some extent by the reaction time and temperature employed.

Where I employ myrcene dihydrochloride as the reagent in the displacement reaction with the ammonium salts, I find that I can prepare 2-chloro-8-acyloxy-2,6-dimethyl-6-octene, the acyloxy group in this case corresponding to a fatty acid containing from 1 to 5 carbon atoms. This compound can be further converted, almost quantitatively to the geranyl ester by dehydrohalogenation with the molten ammonium salt. The geranyl ester resulting from the dehydrohalogenation reaction is approximately 50% of the isopropenyl form since the removal of the halogen from the 2-position results in a shift of the double bond from the normal (isopropylidene) form,

to the isopropenyl form,

The isopropenyl geranyl ester is nevertheless as valuable as the normal geranyl ester in upgrading. Although the 2-chloro-8-acyloxy-2,6-dimethyl-6-octene compound is of main interest for the preparation of hydroxy citronellol, I can also employ the corresponding 2-chloro-6-acyloxy-2,6-dimethyl-7-octene for the preparation of 2-chloro-dihydro-linalool esters. The displacement reaction should preferably be conducted at tempreatures of from 30 to 80° C. and stirring should be employed until approximately 50% of the chlorides are displaced. This method yields a maximum of the 2-chloro products.

In the displacement reaction of myrcene dihydrochloride, it is preferred to use a solvent for the reagents. Reaction temperatures in this type of reaction should preferably be kept below 100° C., i.e. as noted, preferably 30 to 80° C., since dehydrohalogenation may become appreciable at such and higher temperatures.

The time to which the reaction can be carried out will thus depend on the nature and yield of the isomer desired. I have found, for example, that reaction times of the order of one-half hour to eighteen hours can be used, depending upon the type of reagent and the temperature employed. Generally then, the reaction is carried out for a period of time sufficient to give economical yields of the ester or mixed esters desired.

The reaction products obtained by the treatment of myrcene hydrochlorides and ammonium salts of lower saturated fatty acids can be worked up according to know procedures, such as fractional distillation, to isolate the desired compounds.

The following examples illustrate my invention.

EXAMPLE 1

One mole of myrcene hydrochloride was prepared by passing one mole of hydrogen chloride gas into one mole of β-pinene pyrolysate in the presence of 0.2% of cuprous chloride. The addition was conducted at 5 to 10° C. over a period of 24 minutes.

The resulting myrcene hydrochloride mixture was then added over a period of four minutes to 96.0 grams of stirred anhydrous ammonium acetate. The temperature was raised to 90° C. and maintained at 90°–95° C. for 6⅓ hours with vigorous stirring. The mixture was then quenched in cold water and separated with the aid of a separatory funnel. Titration of the aqueous phase revealed that 77% chlorides were displaced. Analysis of the organic phase using vapor phase chromatography showed 41.6% linalyl acetate, 10.3% terpinyl acetate, and 35.7% geranyl and neryl acetates based on weight of starting myrcene contained in one mole of β-pinene pyrolysate. The yield of mixed linalyl and geranyl esters is thus 77.3%.

EXAMPLE 2

One mole of myrcene hydrochloride prepared as in Example 1, was added over a period of four minutes to 102.5 grams of anhydrous sodium acetate. The mixture was heated with vigorous stirring to 90° C. The temperature was maintained at 90°–95° C. for seventeen hours. Titration revealed that 68% of chlorides were displaced. Analysis showed 12.3% linalyl acetate, 4.7% terpinyl acetate, and essentially no geranyl and neryl acetates based on weight of starting myrcene contained in one mole of β-pinene pyrolysate.

Example 2 does not illustrate my invention, but is included in order to show the comparison between a typical alkali metal acetate and ammonium acetate. The striking difference between the two processes is readily observable.

EXAMPLE 3

One mole of myrcene hydrochloride was prepared (15 minutes) as outlined in Example 1, except 0.1% cuprous chloride was used in place of 0.2%. After standing in an ice-bath for 74 minutes, the myrcene hydrochloride was added over a period of 34 minutes to 154.0 grams of stirred molten ammonium acetate at 108°–111° C. The mixture was stirred and heated at 105°–111° C. for one hour. The mixture was then cooled and quenched in water. Eighty-six percent (86%) of chlorides were displaced. The oil phase yielded 34.7% linalyl acetate, 13.1% terpinyl acetate, and 41.2% geranyl acetate. The yield of mixed linalyl and geranyl esters is thus 75.9 percent.

EXAMPLE 4

One mole of myrcene hydrochloride prepared as in Example 3, was added all at once to 534.0 grams of 29% ammonium isovalerate in isovaleric acid. The mixture was heated with stirring for one hour at 95°–100° C. The mixture was then cooled, quenched in water, and titrated for chlorides. Eighty-one percent (81%) of chlorides were displaced. The excess isovaleric acid was removed by vacuum distillation and the residue then shaken with aqueous sodium bicarbonate. The following products were obtained; 18.2% linalyl isovalerate, 6.1% terpinyl isovalerate and 50.4% geranyl and neryl isovalerates based on weight of starting myrcene contained in one mole of β-pinene pyrolysate.

EXAMPLE 5

One mole of myrcene hydrochloride prepared as in Example 3, was added all at once to 254.8 grams of 36% ammonium formate in 98–100% formic acid, freshly prepared from ammonia gas and formic acid and stirred at 75°–95° C.

The mixture was stirred at 95°–100° C. for 20 minutes and was then quenched is 1.5 liters of cold water. The aqueous phase showed 92% of chlorides had been displaced. The oil phase yielded mixed formates containing principally geranyl formate.

EXAMPLE 6

One mole of myrcene hydrochloride prepared as in Example 1 (over a period of 43 minutes) was added to 321 grams of 30% ammonium acetate in acetic acid. The mixture was stirred while heating to 95° C. The mixture was maintained at 95° to 100° C. for 30 minutes. Ninety-five percent (95%) of chlorides were displaced. The following products were isolated; 25% linalyl acetate, 19.1% terpinyl acetate, and 36.4% geranyl and neryl acetates based on the weight of starting myrcene in one mole of β-pinene pyrolysate.

The above examples demonstrate the process of my invention in the displacement reaction of myrcene monohydrochloride with ammonium salts of the lower saturated fatty acids. The above examples also demonstrate the use of myrcene hydrochloride prepared by hydrochlorinating myrcene with HCl in the presence of a cuprous chloride catalyst. The following example shows the use of myrcene hydrochloride prepared by hydrochlorinating myrcene in the absence of cuprous chloride, i.e. according to known prior art methods.

EXAMPLE 7

Myrcene hydrochloride (one mole), prepared by passing 1 mole (36.47 grams) of hydrogen chloride into 1 mole (136.2 grams) of β-pinene pyrolysate (72% myrcene) over a period of one hour at 10 to 15° C. with stirring, was treated with 300 grams of acetic acid containing 21.3 grams of ammonia. The ammonia in this case reacts with acetic acid to form the ammonium acetate. The reaction mixture was heated at 95 to 100° C. for 30 minutes and quenched in water as before. The aqueus phase showed that 88% of the chlorides were displaced. The oil phase contained 9.0% linalyl acetate, 11.5% terpinyl acetate and 23.8% of geranyl (neryl) acetates based on the weight of starting myrcene contained in one mole of β-pinene pyrolysate.

The following examples illustrate the process of my invention wherein myrcene dihydrochloride is employed as one of the reagents.

EXAMPLE 8

Two hundred grams (200) of myrcene dihydrochloride was prepared by passing 64.0 grams (1.75 moles) of hydrogen chloride gas into 136.2 grams (1 mole) of β-pinene pyrolysate (79% myrcene) containing 0.1% cuprous chloride. The temperature was maintained at 5°–20° C. throughout the 2⅔ hour addition period. The mixture was then stored overnight in a deepfreeze.

The myrcene dihydrochloride prepared above was diluted with 110 ml. of glacial acetic acid and was then added dropwise to a stirred mixture of 138.6 grams (1.8 moles) of ammonium acetate dissolved in 450 ml. of glacial acetic acid over a period of 18 minutes at 70°–80° C. The mixture was stirred an additional 35 minutes at 70°–83 C. and was then drowned in water; 56.6% chlorides was found to have been displaced. Crude chloro acetate (191.2 grams) was isolated and distilled. A fraction boiling from 130°–140°/12–13 millimeters (35.0 grams) was found to be pure 2-chloro-8-acetoxy-2,6-dimethyl-6-octene. Redistillation of the material yielded a faintly yellow product boiling at 135–138°/12–13 mm. (chloride analysis; calc. 15.2%, found, 15.17%). The infrared pattern showed the expected acetate, gem dimethyl and chlorine absorptions.

A sample (14.5 grams) of the 2-chloro-8-acetoxy-2,6-dimethyl-6-octene (B.P. 130–140°/12–13 mm.) was added to 40.0 grams of stirred molten ammonium acetate at 109–111° C. over a period of 3 minutes. The stirring was continued while the temperature was raised to 118° C. (8 minutes). The temperature was maintained at 118°–122° C. for 30 minutes. The reaction mixture was then drowned in cold water and extracted with petroleum ether. The isolated product (12.2 grams) was identified as isopropenyl (8-acetoxy-2,6-dimethyl-1,6-octadiene) plus isopropylidene (8-acetoxy-2,6-dimethyl-2,6-octadiene) geranyl acetate.

EXAMPLE 9

Myrcene dihydrochloride (208.5 grams) was prepared from 136.2 grams (1 mole ) β-pinene pyrolysate and 72.3 grams (1.98 moles) of hydrogen chloride gas by passing the gas into the pyrolysate at 3°–11° C. over a period of three hours. The mixture was stored in a freezer for two hours before use.

The myrcene dihydrochloride was diluted with 110 ml. of glacial acetic acid and was added at 63–73° C. to 154.0 grams (2 moles) of ammonium acetate dissolved in 450 ml. of glacial acetic acid, over a period of 14 minutes with stirring. The mixture was drowned in water. The aqueous phase showed that 52.3% of chlorides were displaced. A good yield of 2-chloro-8-acetoxy-2,6-dimethyl-6-octene was obtained.

EXAMPLE 10

Myrcene dihydrochloride (200 grams) prepared as in Example 8 was added to 138.6 grams (1.8 moles) of ammonium acetate in 500 ml. of acetone. The mixture was brought to reflux over a period of 30 minutes, and was maintained at 61–68° C. for 7 hours. The mixture was then drowned in water and the product was salted out while extracting with petroleum ether. Fifty-four percent (54%) chlorides were found to have been displaced. A good yield of 2-chloro-8-acetoxy-2,6-dimethyl-6-octene was obtained.

EXAMPLE 11

Myrcene dihydrochloride (206.0 grams) was prepared from 136.2 grams (1 mole) of β-pinene pyrolystate (79% myrcene) containing 0.1% cuprous chloride and 70.0 grams (1.92 moles) of hydrogen chloride gas. The hydrochlorination was conducted at 2°–16° C. over a period of 1¼ hours. The mixture was allowed to stand in a freezer an additional 1 hour before use.

The above myrcene dihydrochloride was added to 193 grams (2.5 moles) of ammonium acetate dissolved in 400 ml. of glacial acetic acid over 12 minutes at 70°–80° C. The mixture was then heated and stirred for four hours at 80°–84° C., after which the mixture was drowned in water. Extraction with petroleum ether yielded a crude geranyl acetate mixture. Eighty-five percent (85%) of chlorides was found to have been displaced. The crude acetates (175.6 grams) were saponified with 165 grams potassium hydroxide dissolved in methanol (104.4 grams) and were distilled. Approximately 30% of isopropenyl (8-hydroxy-2,6-dimethyl-1,6-octadiene) and isopropylidene (8-hydroxy-2,6-dimethyl-2,6-octadiene) geraniols was obtained based on weight of myrcene in the starting β-pinene pyrolysate.

The residue contained material which boiled higher than 130°/12–13 mm. This material was hydrogenated with a platinum catalyst using absolute ethanol as a solvent. Approximately 7.8% of hydroxy citronellol was isolated by distillation of the hydrogenated material (B.P. 146–153°/12–13 mm.).

It should be realized that carefully controlled conditions are desirable in retaining the 2-chloro group. In Example 8, when the reaction was repeated at approximately 100° C. for 45 minutes, the product was extensively dehydrohalogenated at the 2-position and 72% instead of 57% of chlorides was displaced yielding isopropenyl (8-acetoxy-2,6-dimethyl-1,6-octadiene) and isopropylidene (8-acetoxy-2,6-dimethyl-2,6-octadiene) geranyl acetates as the main products instead of the 2-chloro derivatives. As illustrated in Example 11, when the 2-chloro is allowed to react, it is displaced yielding 2,8-diacetoxy-2,6-dimethyl-6-octene. Saponification and reduction of this product yields hydroxy citronellol.

Although in Example 11, part of the product is isopropenyl and isopropylidene geranyl acetate, rather than 2-chloro - 8 - acetoxy-2,6-dimethyl-6-octene (2-chloro-dihydrogeranyl acetate) the example none the less illustrates the utility of the ammonium acetate process. A method for treating myrcene dihydrochloride with carboxylic acid salts is disclosed and claimed in copending application Serial No. 760,844 filed September 15, 1958.

From the above examples it will be seen that I have provided a unique process for the synthesis of mixed esters, dihydroxy compounds and chloro-hydroxy compounds from myrcene hydrochlorides. The process is economical because of the use of the ammonium salts and the compounds prepared all have utility as intermediates or as ingredients in the manufacture of perfumes.

I claim:

1. In the process for preparing allylic esters from myrcene hydrohalides wherein a myrcene hydrohalide, in which the halogen is selected from the class consisting of chlorine and bromine, is subjected to a displacement reaction by treatment with a carboxylic acid salt under non-aqueous conditions, the improvement which consists essentially in employing a salt of the formula $NH_4X$ in which X is the acyloxy radical of a lower fatty carboxylic acid as the carboxylic acid salt, at a temperature from about 0° C. to 140° C. for a time sufficient to bring about a substantial formation of allylic esters, the amount of said salt being sufficient to supply one equivalent of acyloxy radical per equivalent of halogen in said hydrohalide.

2. In the process for preparing a mixture of linalyl and geranyl esters in which myrcene monohalide, wherein the halogen is selected from the class consisting of chlorine and bromine, is subjected to a displacement reaction by treatment with a salt of a carboxylic acid under non-aqueous conditions, the improvement which consists essentially in employing a salt of the formula $NH_4X$, where X is the acyloxy radical of a lower saturated fatty carboxylic acid at a temperature of about 0° C. to 140° C. for a time sufficient to produce said esters, the amount of said salt being at least one mole per mole of said hydrohalide.

3. In the process for preparing allylic esters wherein myrcene dihydrohalide, in which the halogen is selected from the class consisting of chlorine and bromine, is subjected to a displacement reaction by treatment with a carboxylic acid salt under non-aqueous conditions the improvement which consists essentially in employing a salt of the formula $NH_4X$ wherein X is the acyloxy radical of a lower saturated fatty carboxylic acid in a solvent at a temperature of from about 0° C. to 100° C. for a time sufficient to produce said esters, the amount of said salt being about two moles per mole of said hydrohalide.

4. The process of claim 2 wherein the myrcene hydrohalide is myrcene hydrochloride.

5. The process of claim 3 wherein the myrcene hydrohalide is myrcene dihydrochloride.

6. The process of claim 1 wherein the ammonium salt is the salt of a saturated fatty acid containing from 1–5 carbon atoms.

7. A process according to claim 1 wherein the myrcene hydrohalide is treated in the presence of a lower saturated fatty acid corresponding to that of the ammonium salt.

8. The process of claim 2 wherein a solvent is employed for said reaction mixture.

9. A process according to claim 2 wherein the ammonium salt is ammonium formate.

10. A process according to claim 2 wherein the ammonium salt is ammonium isovalerate.

11. The process of claim 3 wherein the ammonium salt contains from 1 to 5 carbon atoms.

12. The process of claim 3 wherein the ammonium salt is ammonium acetate.

References Cited in the file of this patent

UNITED STATES PATENTS 2,609,388   Knapp et al. _____ Sept. 2, 1952

OTHER REFERENCES

Roberts et al., J. Am. Chem. Soc. 64, 2157–2164 (1942).